Figure 1:
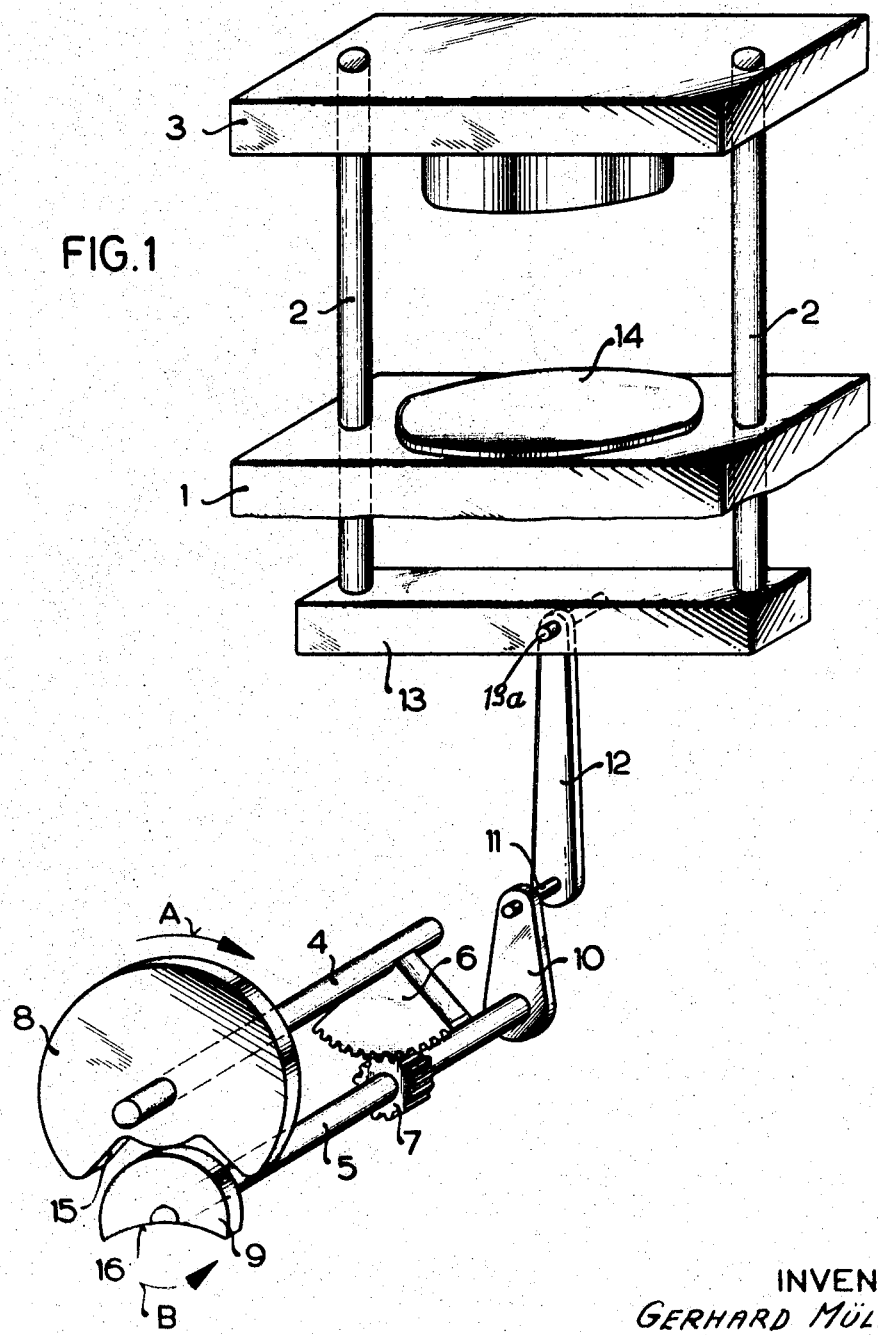

United States Patent

[11] 3,547,053

| | | |
|---|---|---|
| [72] | Inventor | Gerhard Mueller<br>Asperg, Germany |
| [21] | Appl. No. | 791,108 |
| [22] | Filed | Jan. 14, 1969 |
| [45] | Patented | Dec. 15, 1970 |
| [73] | Assignee | Werner & Pfleiderer<br>Stuttgart-Feuerbach, Germany<br>a corporation of Germany |
| [32] | Priority | Jan. 20, 1968 |
| [33] | | Germany |
| [31] | | No. 1,632,355 |

[54] AUTOMATICALLY CONTROLLED DOUGH-PROCESSING DEVICE
6 Claims, 2 Drawing Figs.

[52] U.S. Cl. ................................................. 107/68
[51] Int. Cl. ................................................. A21c 9/00
[50] Field of Search ........................................ 107/68, 15,
15.1, 15.7, 15.9, 8.35; 18/2RA, 21

[56] References Cited
UNITED STATES PATENTS

| | | | |
|---|---|---|---|
| 3,001,159 | 9/1961 | Hilsinger ..................... | 74/436 |
| 3,354,814 | 11/1967 | Friedman .................... | 74/435 |

FOREIGN PATENTS

| | | | |
|---|---|---|---|
| 774,505 | 5/1957 | Great Britain ............... | 107/68 |

Primary Examiner—Henry S. Jaudon
Attorney—Hane and Baxley

ABSTRACT: An automatically controlled dough-processing device has two relatively movable members between which processing of the dough is effected when and while the two members are in a coacting relationship. During each operational cycle of the device the two members are moved into such relationship, maintained therein for a predetermined period of time and then moved out of the coacting relationship. Such movements of the members are controlled by the intermittent rotation of an auxiliary shaft which in turn is controlled by a continuously rotating control shaft.

INVENTOR
GERHARD MÜLLER

AUTOMATICALLY CONTROLLED DOUGH-PROCESSING DEVICE

The invention relates to an automatically controlled dough-processing device in which the dough is subjected to cutting, dividing and kneading operations, and more particularly, the invention relates to a device in which dough-processing is effected by moving the pressing, cutting and kneading assembly of the device into and out of a coacting relationship with a stationary component by the action of lifting means which are controlled by a control shaft also controlling other operations of the device, said control shaft performing one complete revolution during each operational cycle of the device.

BACKGROUND

Among the dough-processing operations to be performed during each operational cycle, that is, during each full rotation of the control shaft, pressing and kneading of the dough takes up a comparatively large portion of the required total time, depending of course upon the specific properties of the dough to be processed. Dividing or cutting of the dough into individual pieces occurs very abruptly so that the period of time required for dividing or cutting the dough is negligible for all practical purposes.

In addition to the time required for pressing and kneading of the dough, a period of time must also be allowed for moving the pressing, kneading and cutting assembly into and out of the operational position. Accordingly, the total time of an operational cycle as completed during each full revolution of the control shaft is composed of the period of time required for pressing and kneading the dough which is substantially fixed, and the periods of time required for moving the kneading, pressing and dividing assembly into and out of the operational position.

It is highly desirable to reduce the total time of an operational cycle as much as possible, as such reduction obviously results in a corresponding increase of the output of the device. As is evident from the previous analysis of the several periods of time involved, the only time which is potentially variable is the time required for moving the pressing, kneading and cutting assembly into and out of position. In other words, it is desirable to assign to these movements a minimal rotational angle of the control shaft.

In dough-processing devices of the kind as hereinbefore referred to, the means effecting lifting and lowering of the dough-processing components are mounted directly on the control shaft which, as stated before, performs a full revolution during each operational cycle. The lifting means generally include cam discs or noses (see German Pat. No. 1,128,375) or are in the form of a crank pin coacting with a frame type sliding block or crank arm (see German Pat. No. 1,160,802). Operation of such lifting means requires a turning angle of one-third to one-half of one revolution of the control shaft. Accordingly, the output of such devices is comparatively low as is evident from the previous discussion. Moreover, cam discs as included in lifting means as hereinbefore known generally require a very steep cam surface which causes unfavorable transmission conditions and high wear and tear. The unfavorable transmission conditions also entail comparatively high construction costs for the components participating in the transmission of the movements.

If the lifting means are in the form of a crank the manufacturing costs are also high, as the upward movement of the pressing, dividing and kneading assembly is very abruptly initiated when the crank arm engages the slide block. Generally speaking, abruptly acting forces of acceleration tend to cause a noisy irregular operation of the device.

In another type of conventional pressing, dividing and kneading devices, the lifting means for the dough-processing assembly comprises a crank which is coupled via a connecting rod with a carrier joining the ends of the lifting rods of the dough-processing assembly. Devices of this kind are described, for instance, in German Pat. No. 956,482. The crank is driven by a continuously rotating motor via a coupling, the up and down movement of the dough-processing assembly being controlled by operation of the coupling. An arrangement of this kind avoids abrupt forces in the device as the crank arm drive gradually accelerates and decelerates the mass of the dough-processing assembly, but the coupling itself is subjected to rapid wear and tear in actual practice. As a result operational difficulties and breakdowns occur frequently, due to inaccurate starting and stopping of the lifting movement of the dough-processing assembly.

THE INVENTION

It is a broad object of the invention to provide a novel and improved dough-processing device of the general kind above referred to, the output of which is considerably higher than the output of devices of this kind as heretofore known.

A more specific object of the invention is to provide a novel and improved dough-processing device of the general kind above referred to, which has a high output and is highly reliable in operation without requiring expensive components and frequent and expensive servicing.

The aforepointed out objects, features and advantages, and other objects, features and advantages which will be pointed out hereinafter are obtained by coupling the means for lifting and lowering the dough-processing assembly with an auxiliary shaft which performs one full revolution during each operational cycle of lifting and lowering the processing means and is coupled with a control shaft by a rotation transmitting means only for part of one revolution of the control shaft. The device of the invention further comprises locking means on the control shaft for arresting the auxiliary shaft while the coupling between the two shafts is disconnected. The period for which the auxiliary shaft is arrested is utilized to perform the required pressing, dividing and kneading operations on the dough. In other words, the auxiliary shaft is arrested when and while the lifting means have lifted the dough-processing means into the position for carrying out these operations.

By arranging the lifting means on an auxiliary shaft, these means can be so arranged that a favorable transmission of force is obtained. This is made possible due to the fact that the auxiliary shaft is turned through an angle of 360°, that is, through a full revolution, while the lifting means move the dough-processing assembly up and down. The period of time required for moving the dough-processing assembly up and the turning angle of the control shaft required for such movements can be considerably reduced whereby the total time required for each cycle is reduced and thus the total output of the device is correspondingly increased.

To effect an accurate control of the up and down movement of the dough-processing assembly and a trouble-free operation of the device, the auxiliary shaft mounting the lifting means is preferably arranged parallel to the control shaft and the rotation transmitting coupling between the control shaft and the auxiliary shaft is effected by a toothed segment mounted on the control shaft and intermittently in mesh with the pinion mounted on the auxiliary shaft. The locking means for intermittently arresting the auxiliary shaft preferably comprise a disc mounted on the control shaft and having in its periphery a segment-shaped cutout complementing the toothed segment to a full circle. This disc slides during the disengagement of the coupling between the control shaft and the auxiliary shaft with its periphery in a cutout of the auxiliary shaft disposed opposite to the control shaft, or coacts with a locking disc secured on the auxiliary shaft.

It has been found advantageous to provide an opening angle of 90° for the toothed segment mounted on the control shaft. Such an angle permits a considerable reduction at the time during which the dough-processing assembly moves up or down, and simultaneously a substantial increase of the output of the machine without requiring a substantial increase in the costs of the device.

A particularly quiet and vibration-free action of the device is obtained by providing as lifting means mounted on the auxiliary shaft a crank arm, the pivot of which is coupled via a connecting rod with a crossbar or carrier supporting rods guided in the frame of the device and carrying the pressing, dividing and kneading assembly.

In the accompanying drawing, a preferred embodiment of the invention is shown by way of illustration and not by way of limitation.

Figure 2:
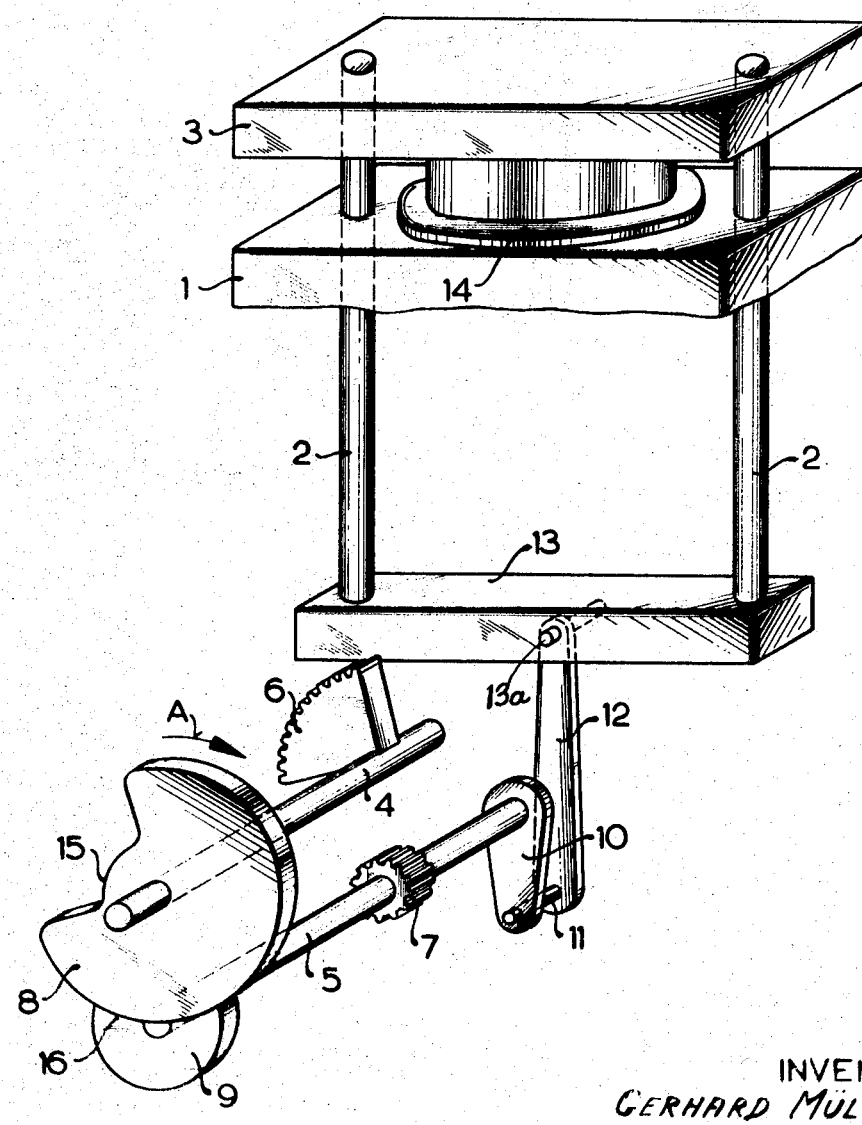

In the drawing:

FIG. 1 is a diagrammatic isometric view of an exemplification of the device according to the invention, the control and driving components of the device being shown prior to the beginning of an operational cycle; and FIG. 2 is a diagrammatic isometric view similar to FIG. 1, but showing the control and driving components in the position in which the dough-processing assembly of the device is in its operating position.

Referring now to the FIGS. more in detail, only those components of the device are shown which are essential for the understanding of the invention.

The exemplified device comprises two upright rods 2 which are slidable up and down in a frame structure 1 of the device. The rods support the dough-processing assembly 3 which is only diagrammatically indicated. The assembly should be visualized as including dough-pressing means, dough-cutting or dividing means and dough kneading means of conventional design. The dough-processing assembly is arranged to coact with a kneading disc or plate 14 stationarily mounted on frame structure 1 for placing thereupon the dough to be processed, as will be more fully described hereinafter. Rods 2 are secured at their lower ends to a carrier or crossbar 13 to effect up and down movement of the processing assembly, as will also be more fully described hereinafter.

The control and drive means of the device comprise a control shaft 4 which performs one revolution for each rotational cycle, and an auxiliary shaft 5 rotatably mounted parallel to shaft 4.

As will be explained more in detail hereinafter, each cycle includes moving the dough-processing assembly from the position of FIG. 1 into the position of FIG. 2, retaining the assembly in this position for a predetermined period of time to effect working of the dough, and returning the dough-processing assembly into the position of FIG. 1.

Control shaft 4 has secured thereon a toothed segment 6 with an opening angle of preferably 90°. Segment 6 coacts with a pinion 7 secured on auxiliary shaft 4. The ratio of transmission between segment 6 and pinion 7 is so selected that when and while pinion 7 is in mesh with segment 6, as is shown in FIG. 2, the pinion, and with it shaft 5 perform one revolution.

Shaft 4 further mounts a disc 8 which has a segment-shaped cutout 15 which complements segment 6 to a full circle, that is, cutout 15 has an opening angle of 90°. Auxiliary shaft 5 mounts a locking disc 9, the diameter of which is such that the disc can freely rotate within cutout 15, as is shown in FIG. 1. The periphery of the locking disc includes a concave recess 16, the curvature of which corresponds to the curvature of the periphery of disc 8 for a purpose which will become evident from the subsequent description.

The auxiliary shaft 5 coacts with a carrier 13 via a crank arm 10 secured at one end to the shaft and hinged on the other end by a pin 11 to one end of a push rod 12, the other end of which is hinged to carrier 13, for instance by a pin 13a. As is evident, rotation of shaft 5 will cause the dough-processing assembly 3 to move up and down with reference to kneading plate 14 for the dough.

FIG. 1 shows the device just before the beginning of an operational cycle. At this stage, segment 6 engages pinion 7 just at the middle of its angle of 90°. Crank arm 10 faces upwardly and accordingly, the dough-processing assembly 3 is lifted to its highest position. Kneading plate 14 is now clear for loading with a dough portion to be processed. To start the device, a motor (not shown) coupled to control shaft 4 is started to rotate the shaft in the direction of arrow A. Rotation of shaft 4 causes auxiliary shaft 5 to be rotated in the direction of arrow B via pinion 7. After shaft 4 has turned through an angle of 45°, that is, through a one-quarter turn, pinion 7 becomes disengaged from segment 6. Shaft 5 has now turned through an angle of 180°, that is, through one-half revolution. Accordingly, crank arm 10 is moved from the position of FIG. 1 into the position of FIG. 2, thereby moving the dough-processing assembly into the coacting position with kneading plate 14, as is also shown in FIG. 2. Simultaneously with the disengagement of pinion 7 from segment 6, locking disc 9 which has freely turned during the first one-half rotation of shaft 5 within cutout 15, engages with its recess 16 the periphery of disc 8 thereby blocking further rotation of shaft 5, as is evident from FIG. 2.

The control shaft continues to be driven by its motor and should be visualized as being operatively coupled in a conventional manner to the dough-processing assembly 3 to effect pressing, dividing and kneading of the dough when and while the assembly remains in the position of FIG. 2. After shaft 4 has turned through 90°, segment 6 again moves into mesh with pinion 7 and the locking of auxiliary shaft 5 is released by recess 16 sliding past the respective edge of cutout 15 so that locking disc 9 can again turn without cutout 15. Shaft 4 completes its one revolution in the direction of arrow A by turning through 45° whereby shaft 5 is again rotated through one-half revolution in the direction of arrow B.

As a result, crank arm 10 is turned back into the position of FIG. 1 and accordingly, the dough-processing assembly is again lifted clear of kneading table 14, or in other words, all the components of the device again occupy the position of FIG. 1. A new cycle can be automatically started, or shaft 4 can now be stopped by automatic operation of suitable and conventional limit switch means.

I claim:

1. An automatically controlled dough-processing device, comprising in combination:

a dough-processing assembly including a stationary member and a movable member movable into and out of a coacting relationship with the stationary member, said assembly being operable in the coacting relationship of said members, operation of the dough-processing assembly and movement of the movable member thereof into and out of the coacting position constituting an operational cycle;

linkage means coupled to said movable member for moving the same into and out of said coacting relationship;

a control shaft for rotation through one revolution during one operational cycle;

an auxiliary shaft;

coupling means coupling said auxiliary shaft with said linkage means;

transmission means coupling the auxiliary shaft to the control shaft for a predetermined part of one revolution of the latter, said transmission means having a ratio such that the auxiliary shaft turns through one revolution while being coupled to the control shaft, said rotation of the auxiliary shaft causing movement of the movable member respectively into and out of said coacting relationship; and locking means coacting with said auxiliary shaft to lock the same and thus the linkage means in the position in which said members are in said coacting relationship when and while the shafts are disengaged from each other.

2. The dough-processing device according to claim 1 wherein said shafts are rotatably mounted in mutually parallel relationship, and said transmission means comprise a pinion on the auxiliary shaft and a toothed segment on the control shaft, said segment moving into and out of mesh with said pinion during the rotation of the control shaft.

3. The dough-processing device according to claim 2 wherein said toothed segment has an angle of 90°, the transmission ratio between said segment and said pinion being such that the auxiliary shaft is turned through one-half revolution when the control shaft is turned through one-quarter of a revolution.

4. The dough-processing device according to claim 2 wherein said locking means for locking the auxiliary shaft comprise a first disc secured on the control shaft and having in its periphery a recess shaped to complement the toothed segment to a full circle, and a second disc secured on the auxiliary shaft in planar alignment with the first disc, said second disc having a diameter fitting said recess for rotation of the second disc therein and including in its periphery a concave recess matching the peripheral curvature of the first disc, the angular positions of the recess in the first disc and of the second disc being so correlated that the second disc occupies said recess when the toothed segment and the pinion are in mesh thereby permitting rotation of the auxiliary shaft and that the concave recess of the second disc is engaged with the periphery of the first disc when and while the toothed segment and the pinion are out of mesh, thereby arresting the auxiliary shaft.

5. The dough-processing device according to claim 1 wherein the movable member of the dough-processing assembly is supported by a slidably mounted carrier, and wherein said transmission means comprise a linkage means including an input link fixedly secured to the auxiliary shaft and an output link hinged to said carrier, said links causing movement of the movable member into engagement with the stationary member during one-half revolution of the auxiliary shaft and out of said engagement during the following one-half revolution of said shaft.

6. The dough-processing device according to claim 5 wherein said input link is a crank arm fixedly secured on one end to said auxiliary shaft and said output link is an arm hinged on one end to the carrier, and wherein a crank pin is rotatably fitted in the other ends of said arms to permit angular movements of the arms with reference to each other.